Sept. 3, 1935. R. E. BECHTOLD 2,013,431
PRESSURE STABILIZER FOR ENTRAPPED LIQUID
Filed Nov. 28, 1932
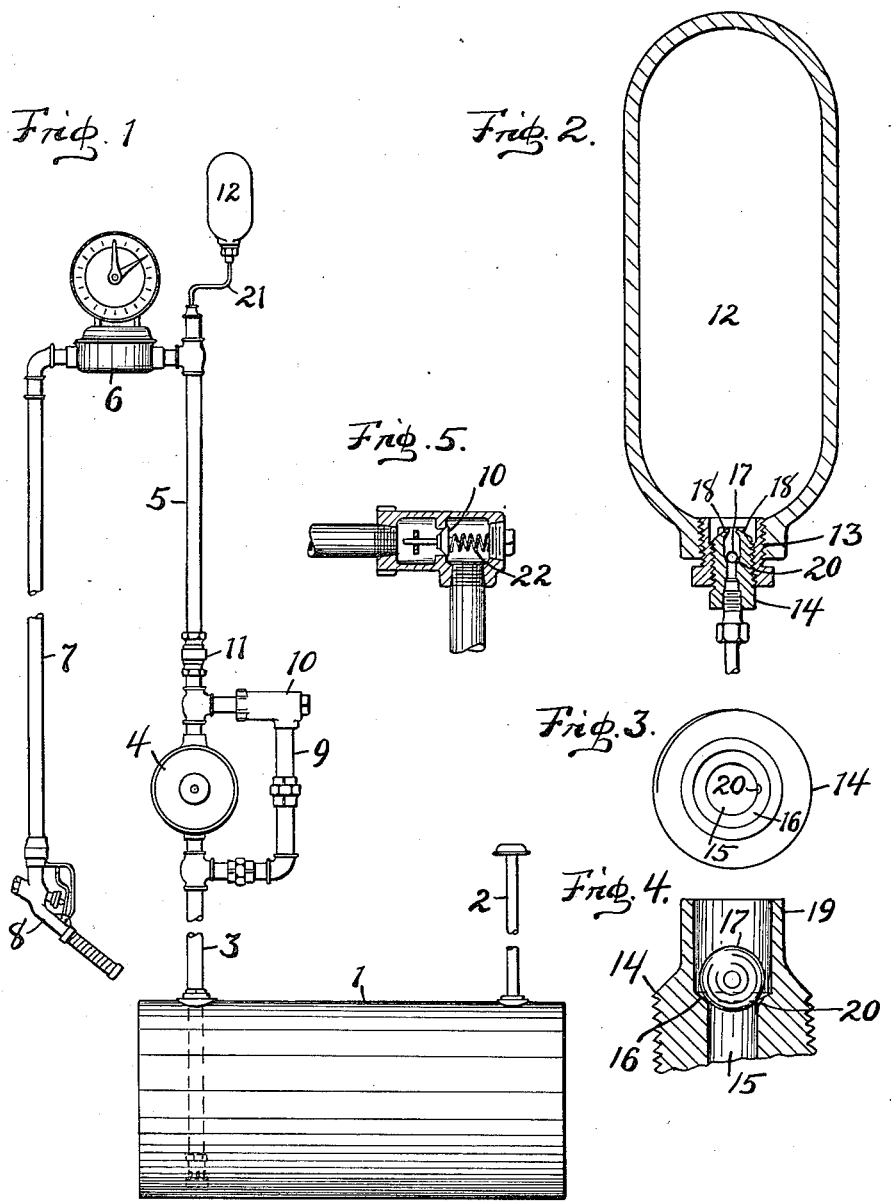
Reuben E. Bechtold, INVENTOR.
BY
H. G. Burns, ATTORNEY.

Patented Sept. 3, 1935

2,013,431

UNITED STATES PATENT OFFICE 2,013,431

PRESSURE STABILIZER FOR ENTRAPPED LIQUID

Reuben E. Bechtold, Fort Wayne, Ind., assignor to Tokheim Oil Tank and Pump Company, Fort Wayne, Ind., a corporation of Indiana Application November 28, 1932, Serial No. 644,657

3 Claims. (Cl. 221—95)

This invention relates to improvements in a pressure stabilizer for entrapped liquid, and is adapted for use in connection with dispensing apparatus in which liquid is confined in a flow line or conduit between control valves that are connected in such line.

The invention is also applicable to other liquid containers when it is desirable that the container be kept completely filled with liquid under greater than atmospheric pressure.

In some apparatuses ordinarily used for dispensing liquid that is more or less volatile, such as gasoline, the liquid is drawn from a suitable storage tank by means of a pump and forced through a flow line in which are usually connected a check valve, a meter, and a manually-operated valvular nozzle.

Normally when such apparatus is in service, the flow line, between the check valve and nozzle valve, and the meter are completely filled with the liquid where it is subject to expansion or contraction due to variations of temperature. When the check valve and nozzle valve are both closed the gasoline entrapped in the flow line between the valves and in the meter tends to expand as its temperature rises which causes leakage through the valves or dangerous stress upon the apparatus. Or, if the temperature of the liquid falls sufficiently as to permit vaporization of the entrapped gasoline, an accumulation of gas takes place within the flow line and meter so that the actual quantity of liquid subsequently dispensed through the nozzle may be inaccurately indicated by the meter resulting in short measurement.

One of the objects of the invention is to provide means whereby pressure upon the liquid entrapped in the flow line and the meter is maintained at such point as to prevent vaporization of the liquid under normal conditions, and also to cushion excessive pressure of the entrapped liquid due to expansion thereof.

Other objects and advantages of the invention will appear in the following description.

An illustrative embodiment of the invention is shown in the accompanying drawing, in which:—

Fig. 1 is a side elevation of a liquid dispensing apparatus equipped with the invention;

Fig. 2 is a vertical section of an air chamber provided with a valve-controlled connection used in the invention;

Fig. 3 is an enlarged detail plan view of the valve fixture for the air chamber;

Fig. 4 is a fragmentary elevation of the valve fixture in section with the valve in place; and Fig. 5 is an enlarged detail section of a by-pass valve for the dispensing apparatus.

In the illustrative embodiment of the invention is shown a storage tank 1 of the type usually installed underground and provided with a vented fill-pipe 2 and a suction pipe 3. The suction pipe is connected with the intake port of a pump 4, and the outlet port of the pump 4 has connected therewith a flow line 5 of piping having connected therein a meter 6 and terminating with a dispensing hose 7 provided with a manually-operated valvular discharge nozzle 8. Also, a by-pass 9 is arranged with its terminals in communication respectively with the suction pipe 3 and the flow line 5, and is provided with a spring-restrained back-flow check valve 10. The flow line 5 preferably is provided with an outflow check valve 11 connected therein between the meter and the point of connection of the flow line with the by-pass.

The storage tank, pump, suction pipe, flow line, meter and the by-pass are of any suitable structure and are arranged as in the usual manner so that upon opening the nozzle valve and operation of the pump, liquid is drawn from the storage tank, measured through the meter, and dispensed from the nozzle.

An especial feature of the invention consists of a capacious air chamber 12 which is closed to the atmosphere, and is provided with an orifice 13 in which is fitted a fixture 14 having an axial bore 15 and a valve seat 16 upon which is disposed a suitable valve, such as a ball 17, so as to permit substantially free admission of fluid through the bore into the chamber 12. Dislodgment of the ball from operating position within the fixture is prevented conveniently by inturned portions 18 of the tip 19 of the fixture. The valve seat 16 has made therein a minute crevice 20 so as to afford a closely restricted passageway for liquid to flow from the chamber past the ball valve when seated back into the flow line and the containing capacity of the chamber is such that the back-flow through the crevice is of sufficient volume as to fully compensate for contraction of the liquid while entrapped in the flow line as rapidly as normal contraction thereof takes place.

The air chamber 12 has communication with the flow line 5 at a point between the check valve 11 and the meter 6 by means of a pipe 21 that is connected with said flow line and the lower end of the valve fixture 14 so that entrapped liquid in the flow line when under pressure enters through the pipe 21 past the valve 17 into the air chamber to such an extent that air pressure is maintained in the chamber to a degree corresponding with the liquid pressure in the flow line.

In operating the invention, the pump is set in motion by any suitable means (not shown) which causes liquid from the storage tank to enter the flow line and pass through the meter and the dispensing hose when the nozzle valve is opened, the quantity of liquid dispensed through the nozzle being indicated by the meter. When the desired quantity of liquid has been withdrawn through the nozzle the valve therein is closed by the operator, and as the pump continues operation liquid pressure is developed thereby in the flow line and meter to a predetermined point at which the restraining influence of the spring 22 against the by-pass valve 10 is overcome, whereupon circulation of the liquid through the by-pass occurs which obviates stalling of the pump. During this operation a more or less definite pressure is established in the flow line 5, meter, and in the air chamber, and owing to the action of the outflow check valve 11 pressure in the flow line above said check valve is maintained, after operation of the pump ceases, because of leakage of fluid from the air chamber back through the crevice 20 against the body of liquid entrapped in the flow line. In this manner the liquid entrapped in the flow line and meter is continually maintained under pressure during periods between dispensing operations when the pump is idle, and thus vaporization of the entrapped liquid and accumulation of vapor in the flow line and meter are averted.

Contraction of the entrapped liquid, due to falling temperature thereof, is compensated by the leakage of fluid pressure from the air chamber into the flow line, and thus under normal conditions the entrapped liquid is continually held under pressure. Should the nozzle valve be momentarily opened by accident or otherwise while the pump is idle, discharge of the entrapped liquid through the nozzle would be negligible and not materially greater than the amount of leakage past the ball valve, and thus sudden exhaustion of pressure in the air chamber and unintentional expulsion of the entrapped liquid in the flow line is circumvented.

By connecting the air chamber with the flow line at a point between the meter and the check valve 11, only unmeasured liquid vacillates between the flow line and air chamber, and thus the meter is not operated or affected materially thereby but is progressed only as discharge takes place through the nozzle. In this manner accurate indication of the actual quantity of liquid dispensed is assured.

I claim:—

1. A pressure stabilizer for a liquid dispenser that has a discharge line in which liquid is entrapped, a capacious chamber closed to the atmosphere having a connection at its lower end with said discharge line, and a valve mechanism associated with said connection provided with a valve seat having a crevice and a valve disposed on said seat so arranged as to permit substantially free passage of fluid from the discharge line into said chamber and to restrict the flow of fluid from said chamber back into said discharge line.

2. In apparatus of the class described, a liquid dispenser discharge line provided with a backflow check-valve at one end, a manually-operated valvular discharge nozzle at its opposite end and a meter connected in said line between said check-valve and nozzle, a chamber closed to the atmosphere having a connection at its lower end with said discharge line, and a valve mechanism associated with said connection and chamber so constructed as to permit substantially free passage of fluid from the discharge line into said chamber and as to restrict flow of fluid from said chamber back into said discharge line.

3. In apparatus of the class described, a liquid dispenser discharge line provided with a backflow check-valve at one end, a manually-operated valvular discharge nozzle at its opposite end, a chamber closed to the atmosphere having a connection at its lower end with said discharge line, and a valve mechanism associated with said connection and chamber disposed to permit substantially free passage of fluid from the discharge line into said chamber and to restrict flow of fluid from said chamber back into said discharge line.

REUBEN E. BECHTOLD.